(12) United States Patent
Sorgi (10) Patent No.: US 7,062,836 B1
(45) Date of Patent: Jun. 20, 2006

(54) PIPE FITTING APPARATUS AND METHODS

(75) Inventor: Lawrence Sorgi, Marblehead, MA (US)

(73) Assignee: QuixxSmart Structures, Inc., Peabody, MA (US)

( * ) Notice: Subject to any disclaimer, the term of this patent is extended or adjusted under 35 U.S.C. 154(b) by 947 days.

(21) Appl. No.: 09/759,978

(22) Filed: Jan. 12, 2001

(51) Int. Cl.
*B23P 17/00* (2006.01)

(52) U.S. Cl. ............................. 29/525.01; 285/123.1; 285/133.11; 285/133.21; 29/407.09

(58) Field of Classification Search ............. 29/525.01, 29/407.09, 407.1; 285/123.1, 133.11, 133.21, 285/330
See application file for complete search history.

(56) References Cited

U.S. PATENT DOCUMENTS

| | | | |
|---|---|---|---|
| 4,839,204 A | | 6/1989 | Yoshino et al. |
| 4,932,257 A | * | 6/1990 | Webb ....................... 73/40.5 R |
| 5,022,685 A | * | 6/1991 | Stiskin et al. .................. 285/45 |
| 5,257,794 A | | 11/1993 | Nakamura |
| 5,269,230 A | | 12/1993 | Nakamura |
| D347,377 S | | 5/1994 | Nakamura et al. |
| D355,588 S | | 2/1995 | Kuwata |
| D355,589 S | | 2/1995 | Kuwata |
| D355,590 S | | 2/1995 | Kuwata |
| D355,843 S | | 2/1995 | Kuwata |
| D356,025 S | | 3/1995 | Kuwata |
| D373,720 S | | 9/1996 | Hirano et al. |
| D374,607 S | | 10/1996 | Shoda |
| D374,608 S | | 10/1996 | Shoda |
| 5,562,478 A | | 10/1996 | Yamamoto |
| D375,451 S | | 11/1996 | Ohkubo |
| D375,599 S | | 11/1996 | Hirano et al. |
| D375,600 S | | 11/1996 | Hirano et al. |
| D376,458 S | | 12/1996 | Hirano et al. |
| D380,374 S | | 7/1997 | Murakami |
| D381,257 S | | 7/1997 | Hirano et al. |
| D386,393 S | | 11/1997 | Ookubo et al. |
| D386,394 S | | 11/1997 | Ookubo et al. |
| D386,395 S | | 11/1997 | Ookubo et al. |
| D386,396 S | | 11/1997 | Ookubo et al. |
| 5,732,732 A | * | 3/1998 | Gross et al. ................. 137/318 |
| D397,211 S | | 8/1998 | Hirano et al. |
| D397,212 S | | 8/1998 | Hirano et al. |
| 5,812,358 A | | 9/1998 | Kawai et al. |
| 5,894,942 A | | 4/1999 | Miyashita et al. |
| D412,101 S | | 7/1999 | Murakami |
| D412,102 S | | 7/1999 | Murakami |

(Continued)

OTHER PUBLICATIONS

Quixx Smart structures from Workmart Systems, Catalogue, approximately Jan. 1999.

*Primary Examiner*—Gregory Vidovich
*Assistant Examiner*—Stephen Kenny
(74) *Attorney, Agent, or Firm*—Nixon Peabody LLP; Donald R. Studebaker (57) ABSTRACT

Described are embodiments of a pipe fitting or connector. The fitting may be used as an atomic element in constructing a variety of different structures, such as shelving formed from pipes, rods, tubular structures and the like that may be connected using a pipe fitting. The pipe fitting may include a punched hole in a top portion and a matching punched hole in a corresponding bottom portion of a sleeve into which a pipe may be inserted. The holes may be used as a visual indicator that the pipe is fully inserted in the fitting. The holes in the top and bottom portions of the sleeve may also be used with a fastener to securely hold an inserted pipe in place by passing a fastener through the holes in the top and bottom portions of the sleeve and also passing the fastener through corresponding holes in the inserted pipe.

16 Claims, 8 Drawing Sheets

U.S. PATENT DOCUMENTS

| | | |
|---|---|---|
| D412,103 S | 7/1999 | Murakami |
| D412,105 S | 7/1999 | Murakami |
| D412,660 S | 8/1999 | Murakami |
| D412,829 S | 8/1999 | Murakami |
| D412,830 S | 8/1999 | Murakami |
| D412,831 S | 8/1999 | Murakami |
| D413,058 S | 8/1999 | Murakami |
| D417,610 S | 12/1999 | Murakami |
| D418,047 S | 12/1999 | Hirano |
| D418,396 S | 1/2000 | Hirano et al. |
| D418,398 S | 1/2000 | Hirano |
| D423,918 S | 5/2000 | Hirano et al. |

* cited by examiner

PIPE FITTING APPARATUS AND METHODS

BACKGROUND

1. Technical Field

This application generally relates to techniques for connecting pipes or other structures, and more particularly to pipe fitting apparatus and methods.

2. Description of Related Art

Various structures, such as shelving arrangements, may be constructed by connecting a series of basic atomic elements. Shelving arrangements may be, for example, standalone units, or may alternatively attach to another structure, for example, as in a shelving arrangement attaching to a wall. A shelving arrangement may form shelves from a series of bars, pipes, or other equivalent having a predefined spacing close enough so as to support items placed across the series of bars. A shelving arrangement may be purchased in a variety of states ranging from, for example, fully assembled, to phases of partial assembly. In completing construction of a shelving arrangement, one may have to connect a series of pipes or rods inserted into a connector in forming a shelving arrangement.

Thus, it may be advantageous and desirable to provide an arrangement for connecting pipes, for example, as may be used in constructing shelving arrangements, facilitating easy assembly. Additionally, it may also be advantageous and desirable to provide an arrangement that provides for securing pipes to pipe fittings or connectors once assembled. Additionally, to aid in assembly, it may be advantageous and desirable to provide a means for visually verifying a degree of insertion of a pipe into a pipe fitting or connector.

SUMMARY OF THE INVENTION

In accordance with principles of the invention is a pipe fitting that facilitates easy assembly of pipes inserted into the pipe fitting, for example, as may be used in connection with constructing shelving units. Pipe fittings may include one or more punched holes that provide a visual indicator that may assist in constructing a shelving arrangement by viewing a degree to which a pipe is inserted into a connector. Thus, one may be able to ensure that a pipe is inserted to a particular point in a pipe fitting. A matched pair of punched holes may also be used in techniques for securing pipes into pipe fittings or connectors once assembled. This may be accomplished, for example, by having matching holes punched in an opening of a pipe fitting, such as a formed by a cylindrical sleeve, and a pipe inserted into the sleeve in the pipe fitting. A fastener, such as a threaded screw, bolt or equivalent may pass through a series of punched holes in the top and bottom portions of the sleeve and top and bottom portions of a pipe inserted into an opening of the sleeve of the pipe fitting.

In accordance with one aspect of the invention is a pipe fitting having at least one member having at least one opening capable of receiving a pipe. The member includes at least one punched hole through one side of said member at said at least one opening.

In accordance with another aspect of the invention is a method for connecting at least one pipe inserted into a member of a pipe fitting. The at least one pipe is inserted into an opening in the member to a first point of insertion. Using the at least one punched hole in the member, it is determined whether the pipe is inserted to a predetermined desired point.

In accordance with yet another aspect of the invention is a method for connecting at least one pipe inserted into a member of a pipe fitting. The at least one pipe is inserted into an opening in the member to a first point of insertion. The member includes at least two punched holes each being in opposite sides of the member. The pipe includes holes corresponding to the punched holes in the member. The pipe is secured into the member by passing a fastener through the holes in the pipe and the member.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF PREFERRED EMBODIMENT(S)

Figure 1A:
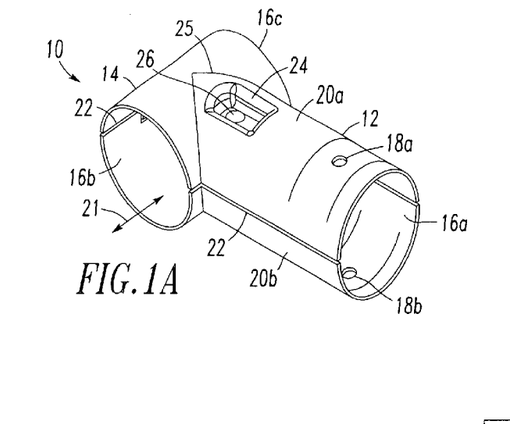
FIGS. 1A through 1D are different views of an example of a first embodiment of a pipe fitting.

Referring now to FIG. 1A, shown is a first view of an example of a first embodiment of a pipe fitting. The pipe fitting 10 in this embodiment is formed of two cylindrical sleeves, 12 and 14. A first cylindrical sleeve 12 is capable of receiving a first pipe, tubing, rod and the like having a tubular like structure that may be inserted into opening 16a of the sleeve 12. The second cylindrical sleeve 14 is connected along line 25 to cylindrical sleeve 12 to form a t-shaped connection. The cylindrical sleeve 14 in this example has two openings 16b and 16c. The first opening is at one end of the sleeve 14 and another opening 16c is at an opposite end in which the sleeve 14 is capable of receiving a tube like structure, rod, or pipe which passes through one opening, such as 16b of sleeve 14 and exits through the other opening, 16c.

The sleeve 12 is open at one end where an opening 16a is capable of receiving a tube-like structure or pipe to a point of insertion into the sleeve 12 such that a first pipe inserted into sleeve 12 forms a T like structure connected to a second pipe passing through sleeve 14 using pipe fitting 10 as a connector.

It should be noted that in this embodiment, the pipe fitting 10 includes the two sleeves 12 and 14 each formed of an upper portion 20a and a lower portion 20b having a seam 22 representing a horizontal cut through the pipe fitting 10. That is, the seam 22 represents a cut through the pipe fitting 10 along a horizontal plane where the top portion 20a and the bottom portion 20b of the pipe fitting 10 meet having a seam 22. The pipe fitting 10 includes a punched hole 18a in the top portion 20a in which the punched hole 18a may have a "mate" or "matching punched hole" 18b also punched in the lower portion 20b of the pipe fitting 10.

The punched holes 18a and 18b may be used for any one of a variety of purposes. For example, either one or both of the holes 18a and 18b may be used as a visual indicator as to how far a tube or pipe is inserted into the sleeve 12. In one embodiment, it may be desired that the tube or pipe be inserted to a predetermined point. The punched holes 18a and 18b may be used as indicators to visually observe how far the tubing is inserted into a sleeve 12. The mated set of punched holes 18a and 18b may also be used in connection with a fastener passing through the holes 18a and 18b and an inserted pipe into the sleeve 12 (not shown) such that the fastener secures the pipe or tube inserted into the sleeve 12. In this example, the pipe or tube inserted into the sleeve 12 would also have matching holes corresponding to those in the top and bottom portions of the pipe fitting 10 such that when a fastener, such as a rivet or a screw, locking device, and the like passes through a punched hole such as 18a and 18b, the fastener also passes through the inserted pipe into the sleeve 12 as a means for securing a pipe in the sleeve 12.

It should be noted that a pipe fitting such as 10 may be made of any one of a variety of materials, such as metal, plastic, and the like. Additionally, it should be noted that in this embodiment a top and lower bottom portion may be manufactured and together form the pipe fitting 10. However, other materials as well as other types of assemblies may be used to form an embodiment of a pipe fitting rather than have a seam 22 formed by a top and bottom half portion as shown in FIG. 1A.

It should be noted that one way of producing the pipe fitting of this and other embodiments described herein is to stamp and form the fitting from sheet steel. In one embodiment, the thickness of the sheet steel is approximately 0.0945 inches. Also, the punched holes, such as 18a and 18b, may have a size (diameter) of approximately 0.1575 inches. These measurements are examples of sizes in one particular embodiment and may also apply to similar corresponding elements shown in other figures described herein. Additionally, it should be noted that such measurements may vary in accordance with each embodiment and should no be construed as a limitation.

Figure 1B:
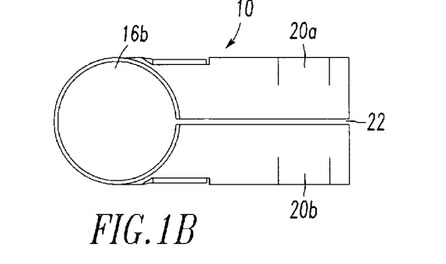

Referring now to FIG. 1B, shown is a side view of the first embodiment of the pipe fitting 10 of FIG. 1A. The side view of FIG. 1B shows the pipe fitting 10 having opening 16b with top and bottom portions 20a and 20b which meet at seam 22.

Figure 1C:
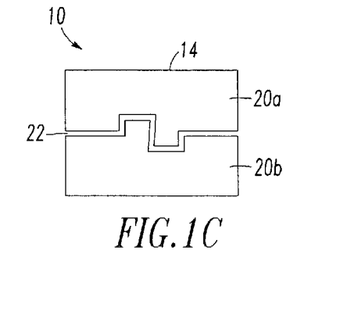

Referring now to FIG. 1C, shown is a view of the pipe fitting 10 of FIG. 1A taken from the side view of the second sleeve 14. Shown in FIG. 1C is the top portion 20a and 20b of the pipe fitting 10 in which a view is taken along the outside of while facing the second sleeve number 14.

Figure 1D:
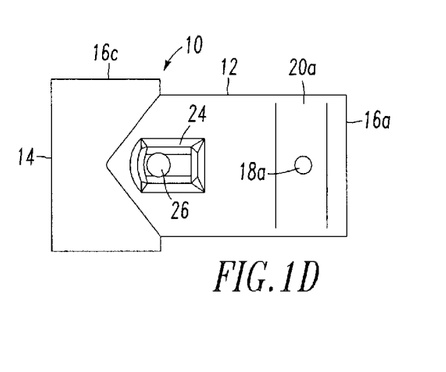

Referring now to FIG. 1D, shown is a top view of the pipe fitting of FIG. 1A. In other words, the view of FIG. 1D is one looking down at the pipe fitting 10 shown in FIG. 1A.

In one embodiment, element 24 may be a hex nut pocket used to captivate and prevent the hex nut from rotating when a fastener is threaded or unthreaded through the hex nut. Element 26 may be a hole having a diameter of approximately 0.287 inches in one embodiment through which a fastener may be inserted to thread a hex nut. This hole 26 may allow the two halves of a pipe fitting to be fastened together thereby rigidly holding two pipes together at a 90 degree angle.

Figure 2A:
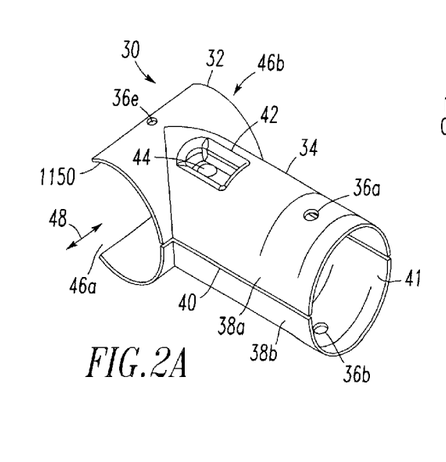
FIGS. 2A through 2D are different views of an example of a second embodiment of pipe fitting.

Referring now to FIG. 2A, shown is an example of a second embodiment of a pipe fitting. Referring now to FIG. 2A, the pipe fitting 30 includes a first sleeve 34 and a curved portion 32 in which the curved portion 32 is connected to the first sleeve 34. The first sleeve 34 is similar to sleeve 12 described in connection with FIG. 1A in that a sleeve 34 is capable of receiving a pipe or other tube-like structure to a point of insertion at one opening that may be examined visually using punched through holes 36a and/or 36b.

The cylindrical portion 32 is capable of receiving a tube like structure or pipe such that the inserted pipe has one side extending out through opening 46a passing through the circular portion 32 with the opposite side of the pipe or tube protruding-or extending out-of opening 46b. The pipe is generally secure within the circular portion 32 such that the movement of an inserted pipe occurs along the axis shown by the arrow 48 in FIG. 2A. In other words, the piping inserted remains generally stationary with regard to movement other than in the direction indicated by arrow 48 thus securing the pipe within the circular curved portion 32 with the exception of movement along the access formed and indicated by the arrow 48. The curved portion 32 is formed by an arc 1150. The length of the curved portion 32 formed by the arc 1150 is such that a pipe inserted along axis of direction generally secure 48 is with regard to movement in any direction other than along the axis indicated by arrow 48. Different arc lengths may be associated with the arc 1150 with a minimum approximately slightly greater than half the circumference of a circle. This is described in more detail and shown in more detail in other figures that follow. In this example, the pipe fitting 30 is formed from a top portion 38a and a bottom portion 38b having a seam 40 similar to that of FIG. 1A. It should be noted that elements 42 and 44 are similar to that as described, respectively, in connection with elements 24 and 26.

Hole 36e may be a punched hole similar, for example, to holes 36a and 36b. Additionally, hole 36e may have a mate or matching punched hole (not shown in this view) in a bottom portion of the curved portion 32.

Figure 2B:
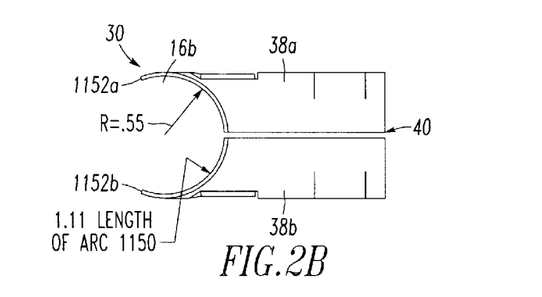

Referring now to FIG. 2B, shown is a side view of the pipe fitting 30 of FIG. 2A. In FIG. 2B, shown is the top portion 38a and the bottom portion 38b forming the pipe fitting 30 having a seam 40 that passes through the pipe fitting 30 in a horizontal direction. Also shown is arc 1150 having a length that may be defined by a starting point 1152a to an end point 1152b where the distance between 1152a and 1152b is approximately slightly more than half of the circumference of a circle as may be formed having a radius "R" as indicated in FIG. 2B.

It should be noted that in one embodiment, a minimum arc length of approximately 1.11 inches may be used with a radius R of approximately 0.55 inches. Other embodiments may include different measurements and should not be construed as a limitation.

Figure 2C:
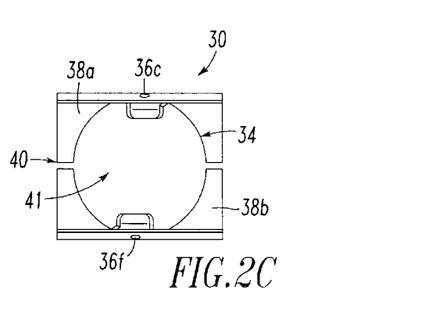

Referring now to FIG. 2C, shown is a view of the pipe fitting 30 from yet another side view looking at the front of sleeve portion 34 inside the sleeve 34 through the opening 41. Shown in FIG. 2C is also the seam 40 having sleeve 34 and top portions 38a and 38b of the pipe fitting 30. Also shown are punched holes 36e and 36f which are described in more detail elsewhere herein.

Figure 2D:
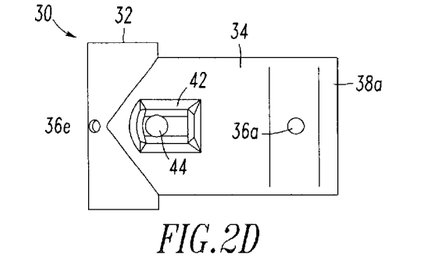

Referring now to FIG. 2D, shown is a top view of the pipe fitting 30 of FIG. 2A. In other words, shown is a view looking downward at pipe fitting 30 of FIG. 2A. Shown in FIG. 2D is the top punched hole 36a of the top portion 38a of the sleeve 34 as well as the top portion of the cylindrical portion 32, and punched hole 36e.

In one embodiment, the size of a punched hole, such as punched holes 36e, 36f, and other punched holes described in connection with this and other embodiments included herein, may be of a size of approximately 0.1575 inches in diameter. Other embodiments may use different sizes and should not be construed as a limitation.

As described in FIG. 2A and other figures herein, top and bottom punched holes, such as 36a and 36b, respectively, may be used for functions and purposes similar to those previously described in connection with FIG. 1A for punched holes 18a and 18b. As described elsewhere herein, the punched holes may be used, for example, as a visual indicator that a tube or pipe inserted into sleeve 34 through opening 41 is fully inserted into the fitting of sleeve 34. Similarly, the punched holes 36a and 36b, and 36e and 36f, may be used in connection with other holes respectively drilled in a pipe that is inserted into sleeve 34 for securing or fastening the pipe into the sleeve 34. It should be noted that other embodiments of the pipe fitting described herein in connection with other figures may also be used for similar purposes, such as the visual indicator and fastening or securing technique.

Figure 3A:
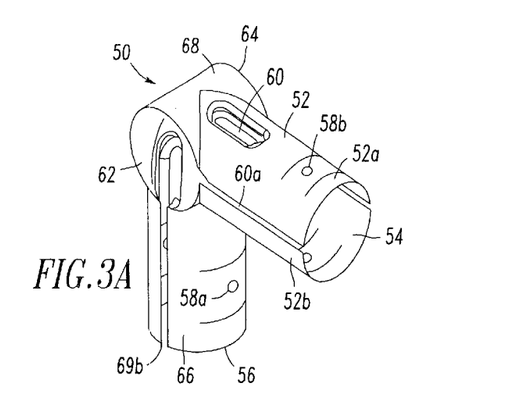
FIGS. 3A through 3D are different views of an example of a third embodiment of a pipe fitting.

Referring now to FIG. 3A, shown is an example of a third embodiment of a pipe fitting. The pipe fitting 50 of FIG. 3A is formed of a first cylindrical sleeve 52, a second cylindrical sleeve 66, and a third cylindrical sleeve 68. The first cylindrical sleeve 52 and the third cylindrical sleeve 66 are each capable of receiving a pipe fitting through one end. For example, sleeve 52 is capable of receiving a pipe fitting inserted into opening 54. Similarly, sleeve 66 is capable of receiving a pipe fitted into opening 56. Sleeve 68 has two openings 62 and 64 at opposite ends such that a pipe inserted into the sleeve 68 passes through from a first opening 62 through the cylindrical sleeve 68 and exits through the opening at the opposite end 64. It should be noted that a pipe may be inserted in the opposite direction with an opening starting at 64 and exiting through 62 as well. Also shown in pipe fitting 50 are punched holes 58a and 58b which may be used similar to other punched holes described elsewhere herein. These punched holds 58a and 58b may also have corresponding "mates" (not shown) at a corresponding point in the opposite half of the sleeve. As described elsewhere herein, a visual indicator for a pipe inserted into the sleeve. A pipe passing through sleeve 68 may be visually verified as fully inserted by having observed an inserted pipe passed through one side of the sleeve such as 62 and protrude from the sleeve 68 through the opposite opening 64. Such an observation is not possible, for example, in connection with sleeves 52 and 66 with an opening at only one end. Thus, use of punch holes 58a and 58b may be used visual indicators that an inserted pipe into a sleeve reaches a desired point of insertion into the pipe fitting 50. Element 60 includes a hole and hex nut pocket, for example, similar to elements 24 and 26 described elsewhere herein.

Figure 3B:
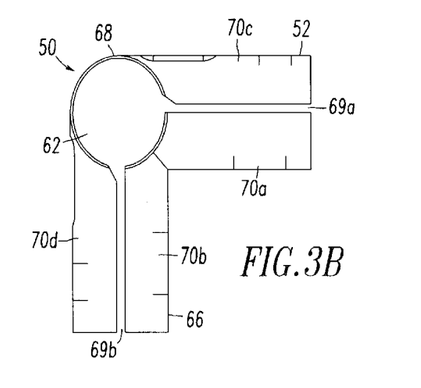

Referring now to FIG. 3B, shown is a side view of the pipe fitting 50 forming a right angle. The figure shows a point of view looking into sleeve 68 through opening 62 and exiting out of the other side of opening 64 of sleeve 68. This view of FIG. 3B of the pipe fitting 50 shows the sleeve 52 having a bottom portion 70a and a top portion 70c with a seam 69a forming a horizontal cut in the horizontal direction of the sleeve 52. Similarly, the sleeve 66 is shown having two parts, 70b and 70d with a seam 69b cut in a vertical direction as indicated in FIG. 3B. In this example, the bottom portions 70a and 70b may be connected in a single unit and the top portions 70c and 70d may form another unit. In other words, in this example the pipe fitting 50 may be formed of two pieces having the seams formed as 69a and 69b.

Figure 3C:
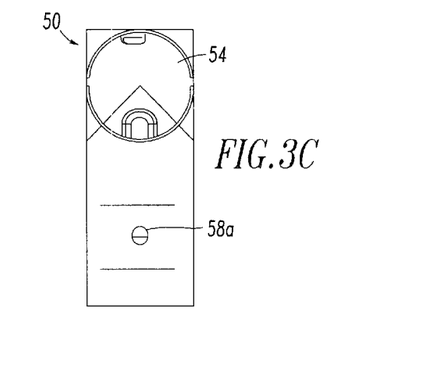

Referring now to FIG. 3C, shown is one side view of the pipe pitting of FIG. 3A looking into sleeve 54. Shown is the punched hole 58a. In one embodiment, as described in connection with other such punched holes also included in other embodiments herein, the punched hole may have a diameter of approximately 0.1575 inches or 4 mm.

Figure 3D:
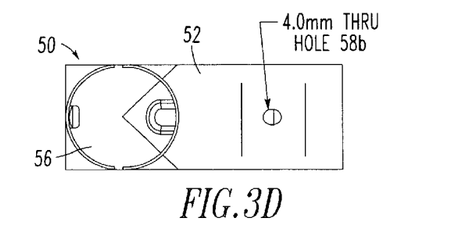

Referring now to FIG. 3D, shown is another side view of the pipe fitting 50 of FIG. 3A looking into sleeve 56. Shown is the punched hole 58b which may also have a matching hole (not shown) in an opposite side of sleeve 56 in alignment with punched hole 58b forming a pair of matching or mating punched holes.

Figure 4A:
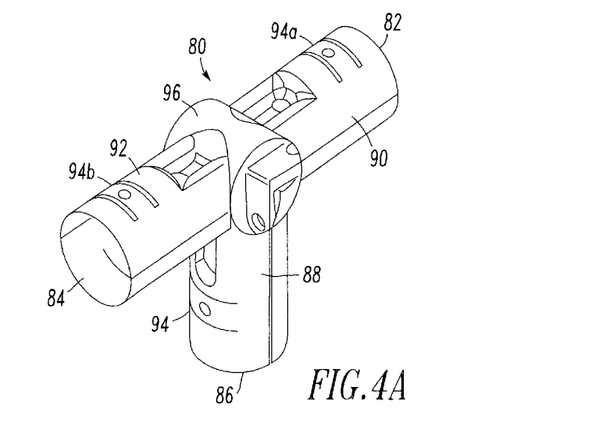
FIGS. 4A through 4D are different views of an example of a fourth embodiment of a pipe fitting.

Referring now to FIG. 4A, shown is an example of a fourth embodiment of a pipe fitting. Referring to FIG. 4A, shown is a pipe fitting 80 that is a three way pipe fitting or connector having openings 82, 84 and 86. The pipe fitting 80 is formed of three sleeves, 88, 90 and 92. Each of the sleeves includes a punched hole in a first portion, such as sleeve 90 includes punched hole 94a, sleeve 92 includes punched hole 94b and sleeve 88 includes punched hole 94c. As described elsewhere therein each of these punched holes may also have a "mate" or corresponding punched hole in an opposite portion. Each of these sleeves is capable of receiving a tube or pipe inserted into the sleeve and may be observed using as a visual indicator the punched hole 94a regarding the insertion degree of the tube into the sleeve. The three sleeves 88, 90 and 92 form a "T" having a center 96 at which each of the sleeves meet and terminate with their respective closed ends.

Figure 4B:
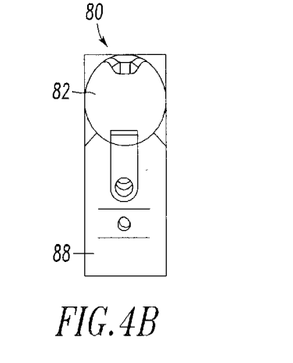

Referring now to FIG. 4B, shown is a side view of the pipe fitting 80 of FIG. 4A. Shown in FIG. 4B, for example, is a side view facing an opening of a sleeve, such as the sleeve opening 82 of sleeve 90 in which sleeve 88 is indicated underneath the opening 82. It should be noted that similar views may also be obtained by looking at the side view into the sleeve 92 at opening 84 and similarly by looking into opening 86 of sleeve 88.

Figure 4C:
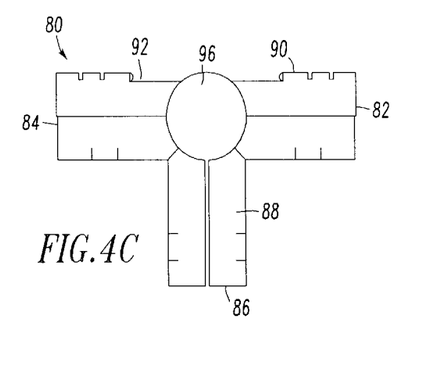

Referring now to FIG. 4C, shown is another side view of the pipe connector 80 of FIG. 4A. In this view of FIG. 4C, the T-like formation of the three sleeves 88, 90 and 92 where the common juncture forms a terminating connector 96 may be seen. Each of the respective sleeve openings 82, 84 and 86 are also observed in FIG. 4C.

Figure 4D:
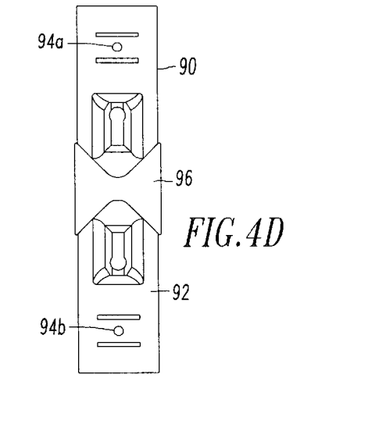

Referring now to FIG. 4D, shown as a top view of the pipe fitting 80 of FIG. 4A. In other words, FIG. 4D represents a view looking downward at the pipe fitting 80 previously described in connection with FIG. 4A. In this example, the punched holes 94a and 94b of the respective sleeves 90 and 92 may be observed. Also shown is a common termination point or connector for the three sleeves 96.

To summarize the embodiments described thus far, a variety of different types of pipe fitting or connectors have been described. For example, in connection with FIGS.

1A–1D, different views of a first embodiment of a pipe fitting are described herein for connecting two pipes. A first pipe passes through a cylindrical portion open at both ends, and a second pipe may be inserted into a sleeve having an opening at one end. In connection with FIGS. 2A–2D, as also described herein, is a pipe fitting for connecting two pipes in which a first pipe passes through an arc-like portion rather than a cylindrical sleeve open at both ends as in FIGS. 1A–1D to secure one of the pipes. Described in connection with FIGS. 3A–3D, is a three-way pipe fitting. This pipe fitting includes two sleeves each open at only one end to receive a pipe. The two sleeves are connected to a third member having a "pass through" capability with two open ends rather than only one open end for receiving a pipe. In connections with FIGS. 4A–4D, is a three way pipe fitting including three sleeves having only an opening at one end of each of the sleeves forming a T-like shape with a common point of termination for all of the sleeves.

What will now be described in connection with FIGS. 5A–5D is a two-way connector that is a variation of the fourth embodiment just described herein in connection with FIGS. 4A–4D. FIGS. 5A–5D illustrate a two way pipe connector using two of the sleeves previously described in connection with FIGS. 4A–4D rather than three sleeves.

Figure 5A:
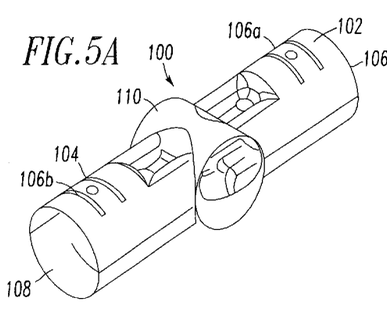
FIGS. 5A through 5D are different views of an example of a fifth embodiment of a pipe fitting.

Referring now to FIG. 5A, shown is an example of a fifth embodiment of a pipe connector 100. The pipe connector 100 includes two sleeves 102 and 104. The first sleeve 102 has an opening 106 for receiving a first pipe or tube-like structure. Similarly, a second sleeve 104 has an opening on one end 108 also for receiving a tube or pipe structure. Sleeves 102 and 104 terminates at connector 110 which joins the first sleeve 102 with the second sleeve 104. As described in connection with other figures, sleeve 102 has a single open end 106 into which a pipe may be inserted. Shown in the sleeve 102 is a punched hole 106a. It should be noted that although not shown, a "mated" punched hole may be included in the bottom portion of sleeve 106 that matches the location of punched hole 106a as indicated in FIG. 5A. The punched hole 106a and the matching punched hole (not shown) in the bottom portion of the sleeve 106 may be used as described elsewhere herein, for example, as a visual indicator for identifying whether or not the tube is fully inserted into sleeve 106, or as a pilot hole that may be used with a self-drilling fastener as a structural or safety feature for securing a pipe into the sleeve 106 in a fastened or secured manner. It should be noted that the sleeve 104 also includes a similar punched hole, 106b in the top portion and a "mated" punched hole may also be included in the bottom portion of sleeve 104 functioning similar to as described in connection with those punched holes included in sleeve 102.

Figure 5B:
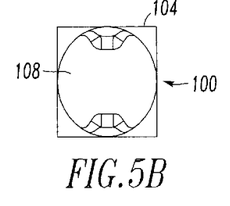

Referring now to FIG. 5B, shown is the side view of the pipe fitting 100 previously described in connection with FIG. 5A. The FIG. 5B shows the pipe fitting 100, for example, with a view looking into the side of a sleeve, such as into the side of sleeve 104 through opening 108.

Figure 5C:
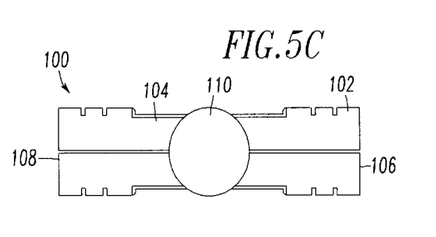
Figure 5D:
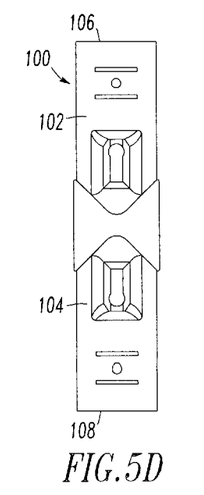

Referring now to FIG. 5C, shown is another side view of the pipe fitting 100 of FIG. 5A. In this view, the two sleeves 102 and 104 may be observed as terminating and connected at connector location 110. Referring now to FIG. 5D shown is a top view looking down at the pipe fitting 100 previously described in connection FIG. 5A.

Figure 6A:
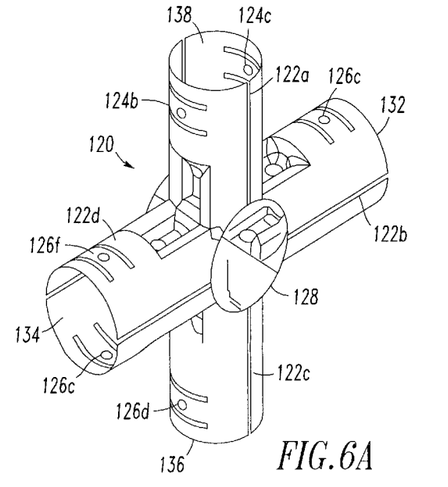
FIGS. 6A through 6D are different views of an example of a sixth embodiment of a pipe fitting.

Referring now to FIGS. 6A–6D, what will now be described is a four-way pipe fitting connector. Referring now to FIG. 6A, shown is an example of a sixth embodiment of a pipe fitting. The pipe fitting 120 includes four sleeves 122a–122d each of which are cylindrical. Sleeve 122a is open at one end to receive a pipe or other tube-like structure, and is closed at the other end terminating at connector 128. Connector 128 serves as a terminal or common point for each of the four sleeves. It should be noted that sleeve 122a includes "matching" punched holes 124a and 124b which match with respect to corresponding locations in different portions of the cylindrical sleeve 122a. Also shown in FIGS. 6A is sleeve 122d which also includes matching punched holes 126e and 126f. It should also be noted that each of the other sleeves 122b–122d may similarly include matched pairs of punched holes. The punched hole pair may be used, for example, in connection with functions described elsewhere herein, such as a visual indicator as well as in connection with a securing means, for example, as a pilot hole that may be used with a self drilling fastener, or a drilled hole fastened with a rivet inserted therethrough as a structural or safety feature for securing a pipe into the pipe connector 120. Also shown in the pipe fitting 120 for sleeve 122a is an opening at one end 138. Similarly, openings are shown in the sleeves 122b–122d for each of the sleeves of the pipe fitting 120.

Figure 6B:
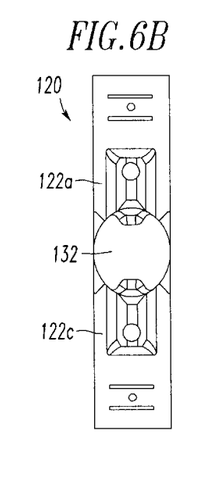

Referring now to FIG. 6B, shown is a first side view of the pipe fitting 120 looking into a respective opening of a sleeve. For example, shown in FIG. 6B is an example view of looking into opening 134 of sleeve 122d in which sleeve 122a is above and sleeve 122c is below the opening 134.

Figure 6C:
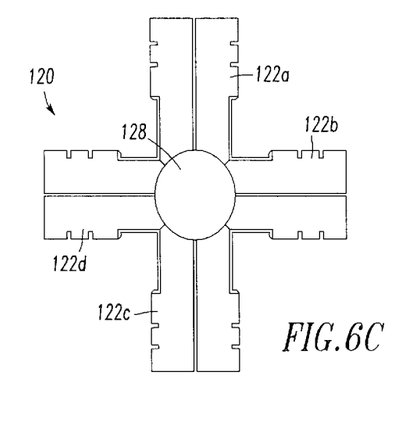

Referring now to FIG. 6C, shown is an example of a top or a bottom view of the pipe fitting 120 previously described in connection with FIG. 6A. For example, FIG. 6C shows each of the four sleeves 122a–122d extending from the center portion or 128 forming an X or cross-like configuration.

Figure 6D:
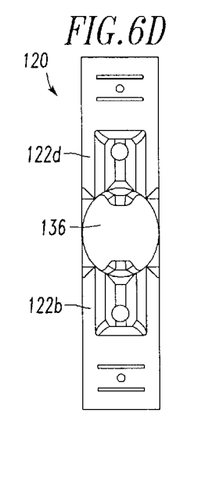

Referring now to FIG. 6D, shown is another side view similar to that previously described in connection with FIG. 6B of the pipe 120.

Figure 7A:
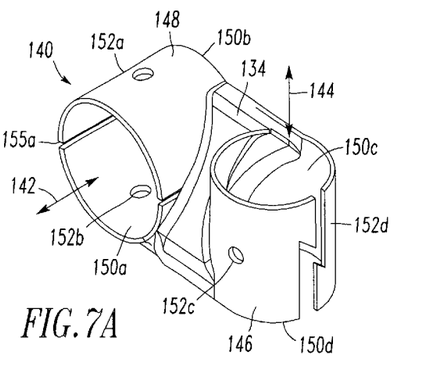
FIGS. 7A through 7D are different views of an example of a seventh embodiment of a pipe fitting.

Referring now to FIG. 7A, shown is an example of a seventh embodiment of a pipe fitting. The two-way pipe fitting 140 may be used for connecting two pipes or tube-like structures inserted in each of two cylindrical members or cuff-like structures 148 and 146. It should be noted that in one embodiment, the two members 146 and 148 may form one contiguous piece or unit. Each of the cylindrical members 146, 148 is open at both ends. Cylindrical sleeve 146 may receive a pipe inserted along the directional axis as indicated by arrow 144. Similarly, cylindrical member or sleeve 148 having openings at both ends of 150a and 150b is capable of receiving a pipe inserted along the direction indicated by arrow 142. Member or cylindrical sleeve 146 may include-matching punched holes 152c and 152d, each being in a different portions of the sleeve 146. Similarly, sleeve 148 may include punched holes 152a and 152b in respective corresponding top and bottom portions of sleeve 148. Each of the sleeves 146 and 148 may be joined by a connecting portion 154 that connects members 146 and 148.

Figure 7B:
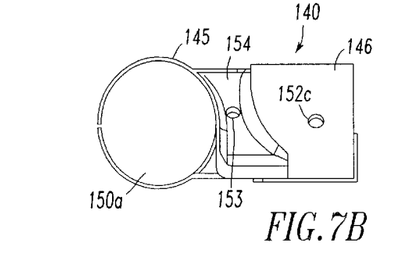
Figure 7C:
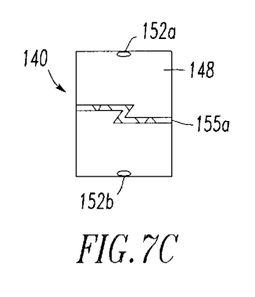

Referring now to FIG. 7B, shown is a side view of the pipe fitting 140 previously described in connection with FIG. 7A. The pipe fitting 140 is shown with a view looking into cylindrical sleeve 148 through opening 150a. Referring now to FIG. 7C, shown as another example of a side view of the pipe fitting 140 previously described in connection with FIG. 7A. In particular, referring to FIG. 7C, shown is a view of member 148 from another side of sleeve 148. FIG. 7C shows a side view showing seam 155a and punched holes 152a and 152b previously described in connection with FIG. 7A.

Figure 7D:
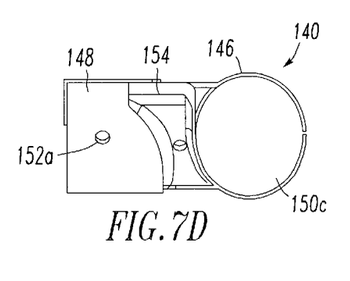

Referring now to FIG. 7D, shown is a complimentary side view of the pipe fitting 140 previously described in connection with FIG. 7B. In other words, this viewpoint shown as FIG. 7D is shown looking through opening 150c of member 146 rather than member 148 as in FIG. 7B.

Figure 8A:
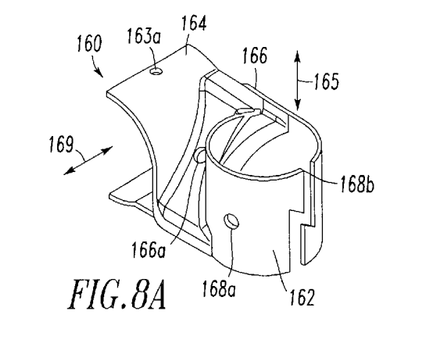
FIGS. 8A through 8D are different views of an example of an eighth embodiment of a pipe fitting.

Referring now to FIG. 8A, shown is an example of an eighth embodiment of a pipe connector. In the embodiment that will be described in connection with FIGS. 8A–8D, the pipe fitting 160 is a variation of the pipe fitting previously described in connection with FIGS. 7A–7D. The pipe fitting 160 includes a first cylindrical sleeve or member 162 having two openings one at each end similar to that as described in connection with sleeve 146 of pipe fitting 140. Also shown in pipe fitting 160 is a curved portion 164 that may be used for securing a second pipe inserted along the direction of axis 169. It should be noted that the curved portion 164 of pipe fitting 160 shown in FIG. 8A may be similar to that as described in FIG. 2A in connection with curved portion 1150 of pipe fitting 30. Generally, the curved portion 164 may be used for securing a pipe inserted along the direction indicated by arrow 169, such that the piping remains relatively stationary and is generally movable only in the direction along the axis indicated by the direction of the arrow 169. Similarly, cylindrical member or sleeve 162 may also be used for securing a pipe injected into the sleeve 162 in the direction indicated along the arrow 165. It should be noted that the middle connecting portion 166 that connects the sleeve or cylindrical member 162 to the curved portion 164 is similar to that as described in connection with FIG. 7A element 154.

Included in portion 164 is a punched hole 163a which may also have a mate or matching punched hole (not shown) in an aligned position in the bottom portion opposite that of hole 163a. Hole 163a and the matching hole may be used for visual inspection of an inserted pipe, securing the inserted pipe, and the like as described in connection with other matched holes included herein. Punched holes 168a and 168b are also shown as a similarly mated or matching punched hole pair.

Figure 8B:
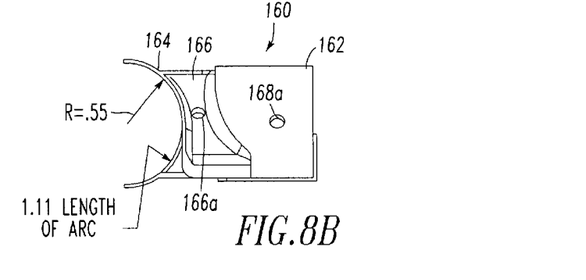

Referring now to FIG. 8B, shown is a side view of the pipe fitting 160. Shown in FIG. 8B is a side view looking into curved portion 164 along the direction as indicated by the arrow 169 previously described in connection with FIG. 8A. It should be noted that the length of the arc formed by the cylindrical portion 164 is large enough to hold a pipe inserted along the direction indicated by arrow 169 in a generally stationary and secure position to minimize the movement in other directions. As described in connection with other embodiments, one embodiment may include a minimum arc length of approximately 1.1 inches with a radius R of approximately 0.55 inches. Other measurements may be included in an embodiment.

Figure 8C:
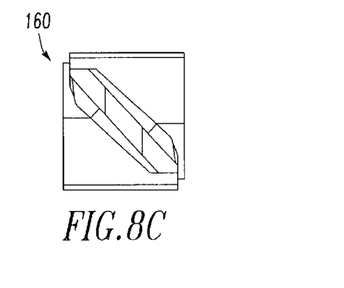

Referring now to FIG. 8C, shown is another example of a side view of the pipe fitting 160 of FIG. 8A.

Figure 8D:
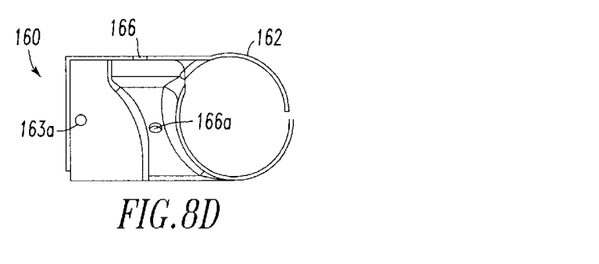

Referring now to FIG. 8D, shown is another example of a side view of the pipe fitting 160 of FIG. 8D. In this side view, FIG. 8D displays a viewpoint looking into the opening of cylindrical sleeve 162. Hole 166a may be used, for example, to allow a threaded fastener to hold together and connection portions 162 and 164 to form a pipe fitting as shown.

In the embodiment shown in connection with FIGS. 8A–8D, it should be noted that a punched hole may be inserted into a top portion of cylindrical sleeve or member 162. The top portion punched hole may be indicated as hole 168a having a bottom or complimentary punched hole in a corresponding position in a bottom portion of the member 162. As described elsewhere herein, in combination these pairs of punched holes may be used, for example, as a means for fastening a pipe within the pipe fitting 160. Such as a pilot hole used in connection with a self-drilling fastener.

Figure 9A:
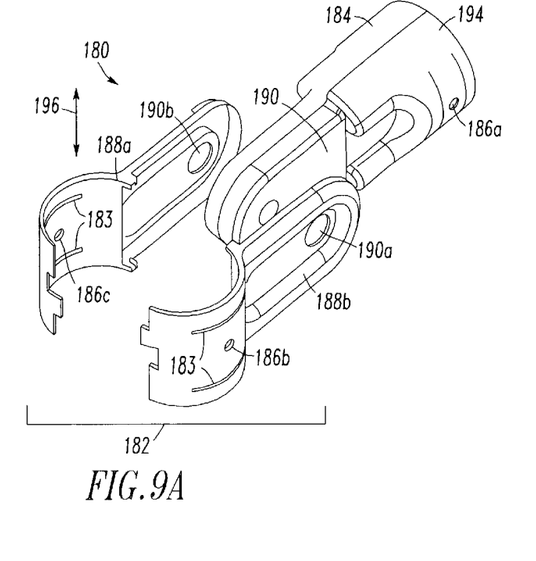
FIGS. 9A through 9D are different views of an example of a ninth embodiment of a pipe fitting.

Referring now to FIGS. 9A–9D, shown is an example of another embodiment of a pipe fitting or connector. Referring now to FIG. 9A, the pipe fitting 180 includes a cylindrical member 184 attached to a portion 182 at connection portion 190. Portion 182 may be formed of a pair of arms or clamp-like members. Connection portion 190 is an extension of cylindrical member 184 that overlaps with an area of portion 182. Member 184 may be formed in this embodiment as a one piece unit having an opening 194 at one end having a diameter sufficient for receiving a single end of a pipe that may be inserted into member 184. The pipe inserted into member 184 may be connected through connection portion 190 and the portion 182 to another pipe that may be inserted into portion 182. Cylindrical member 184 may include a punched hole 186a formed and passing through one side of a wall of the member 184 and may have a matching punched hole (not shown) in a corresponding location on an opposite wall of member 184. As described elsewhere herein, punched holes such as 186a and its matching punched hole that may be formed on an opposite wall may be referred to as "matching holes" or "mated holes" that may be used, for example, as a visual indicator for observing the degree of insertion of a pipe into member 184 through opening 194. Additionally, as also described in more detail elsewhere herein, the matching holes may be used to secure or fasten the pipe within member 184.

In this embodiment, the connecting portion 190 extends from the cylindrical member 184. The connecting portion 190 is narrower than member 184 and overlaps an area of portion 182. Portion 182 includes two members or clamp-like arms 188a and 188b which may be attached respectively at points 190b and 190a to connecting portion 190. The two arms 188a and 188b may be attached to member 184 at connecting portion 190 using a means for securing or fastening each of the arms or clamps 188a and 188b to the connecting portion 190 using through holes formed in each of the arms or clamps 188a and 188b and are mated with a corresponding opening in the connecting portion 190. In other words, a threaded screw or other fastener may be passed through a series of holes or openings in arm 188b, connecting portion 190, arm 188a to secure the portion 182 that includes arms 188a and 188b to cylindrical member 184.

It should be noted that the fastener or other securing means, such as a screw or other type fastener passing through the portions 188a, 188b and 190 may secure member arms 188a–188b in a relatively secure and stationary position when, for example, the fastener, threaded screw, and the like is in a tightened position. An embodiment may also provide for allowing the clamps or arms 188a and 188b to extend through, and be secured in, any one of a range of positions. The range of positions may be defined by an arc or circle formed by the member arms 188a–188b as a radius having a center at connecting points 190a and 190b. The arms 188a and 188b may be placed in any one of a variety of positions on the arc when the screw or fastener passing through at connecting points 190a and 190b is a set in a loose or unsecured position. The fastener may be tightened so as to secure the member arms 188a–188b at a particular point, for example, such as a screw or bolt being positioned in a snug fitting arrangement with the members 188a–188b such that each of the member arms 188a and 188b is securely and snugly positioned against member 184 at corresponding points in connecting portion 190. It should be noted that when a fastener, threaded screw, and the like passes through openings 190a and 190b and also through corresponding holes in connecting portion 190, each of the member arms 188a and 188b is pulled inward such that a force is exerted by the fastener to hold the member arms 188a–188b secure in a relatively stationary position. It should be noted that the degree of movement that may be exhibited by the arms 188a and 188b is in accordance with how tight the fastening means was tightened or secured.

As described above, the portion 182 may be formed of the two clamp-like members or arms 188a and 188b. Each of the arms 188a and 188b includes a first area that overlaps with the connection portion 190 and an arc portion extending from the first area such that when the arms 188a and 188b are connected to connection portion 190 form a cylindrical sleeve open at both ends. An inward force may be exerted by tightening a fastener to hold the arms 188a and 188b in a relatively stationary position such that a pipe or other tube like structure that may be inserted into the arms 188a and 188b, for example, along the direction as indicated by arrow 196 is also held in a stationary position. Included in each of the arms 188a and 188b are punched holes 186c and 186c that form a pair of matching punched holes. As described elsewhere, these punched holed may be used, for example, for securing a pipe into members 188a and 188b by passing a fastener such as a threaded screw through the pair of punched holes.

It should also be noted that the pipe fitting 180 of FIG. 9A may include ribbings 183 to increase the holding power of the pipe fitting with respect to an inserted pipe, and the like between members 188a and 188b. Note that the pipe fitting in FIG. 9A is an example of the number of ribbings that may be included. Other embodiments may include a varying number of ribbings from that shown in FIG. 9A. Other embodiments of a pipe fitting described elsewhere herein in connection with other figures may also similarly include a varying number of ribbings from that shown in the example embodiments included herein.

Figure 9B:
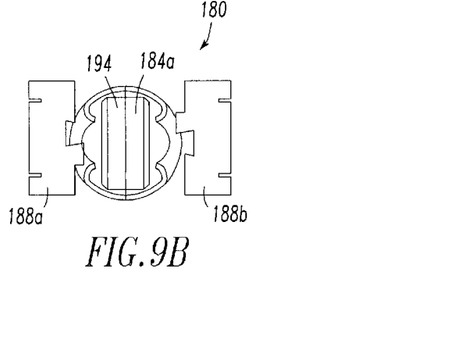

Referring now to FIG. 9B, shown is a view of the pipe fitting 180 of FIG. 9A taken from a back view looking into opening 194 of member 184.

Figure 9C:
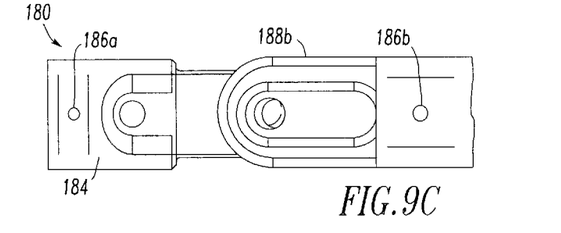

Referring now to FIG. 9C, shown as another view of the pipe fitting 180 previously described in connection with FIG. 9A. FIG. 9C shows a side view of the pipe fitting 180 as may be observed by the labeling of components and openings in FIG. 9C that are previously described in connection with FIG. 9A.

Figure 9D:
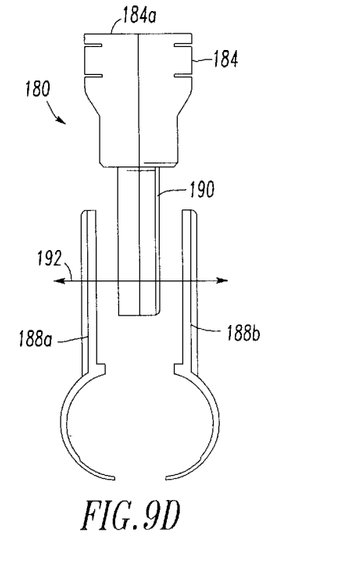

Referring now to FIG. 9D, shown is a top view looking down at the previously described pipe fitting 180 of FIG. 9A. Shown in FIG. 9D, the pipe fitting 180 is shown as being made of three separate pieces comprising the two members previously described. One piece 184 corresponds to the entire number 184 previously described. Portions 188a and 188b comprising portion 182 may be formed as separate arms attached to connecting portion 190 along the axis as indicated by arrow 192 in FIG. 9D. It should be noted that the arrow indicated by element 192 as shown is a line drawn through matching holes in connecting portion 190 and in each of the number arms 188a and 188b through which a fastening means such as a screw or a bolt may be passed.

Referring now to FIGS. 10A–10D, described is a tenth embodiment of a pipe fitting that may be used to connect two pipes or tube like structures. It should be noted that the bushing of FIG. 11E, described elsewhere herein in more detail, may also be used with the pipe fitting arrangement of FIGS. 10A–10E.

Figure 10A:
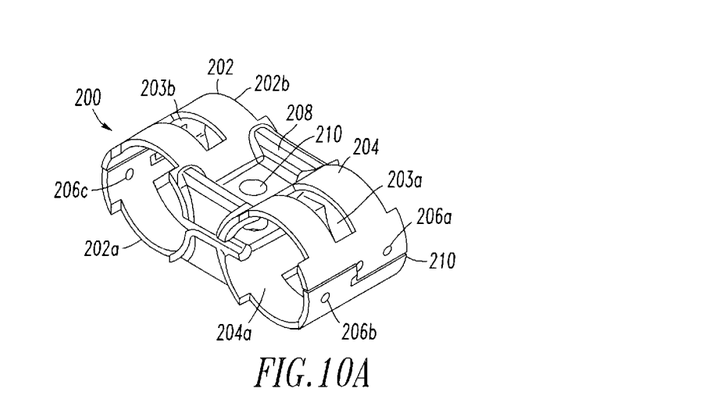
FIGS. 10A through 10D are different views of an example of a tenth embodiment of a pipe fitting.

Referring now to FIG. 10A, shown is a pipe fitting 200 that includes two cylindrical sleeves or cuffs 202 and 204. Each of these cuffs or sleeves is open at both ends such that a pipe may be passed through one side or one opening and protrude from or extend from the other opening at an opposite side. Each of these cylindrical sleeves or cuffs is connected by connecting portion 208. Hole 210 in the connecting portion 208 may be used in connecting and securing the two sleeves together in the arrangement as shown in FIG. 10A. A threaded screw or other fastener may pass through holes in the connecting portion 208 and areas extending from each of the two sleeves such that these areas extending from the sleeves face inward toward each other and overlap with connection portion 208.

It should be noted that sleeve 204 may include one or more punched holes such as 206a and 206b each having a corresponding aligned opening or punched hole(not shown) in an opposite face or side of the sleeve 204 such that, as described elsewhere herein, a fastener such as a threaded screw and the like may be used to secure a pipe that is inserted into sleeve 204. Similar use of punched holes may also be used in connection with sleeve 202, such as punched hole 206c and others that may be included but are not shown in this particular view of the pipe fitting 200.

It should also be noted that holes 206a and 206b may also be used as a positioning or anti-rotational device in a hinge application arrangement.

Figure 10B:
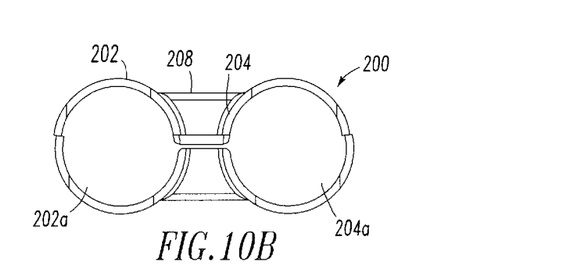

Referring now to FIG. 10B, shown is a front view of the pipe fitting 200 as looking through each of the openings 202a and 204a of the corresponding sleeves 202 and 204 connected by connecting portion 208.

Figure 10C:
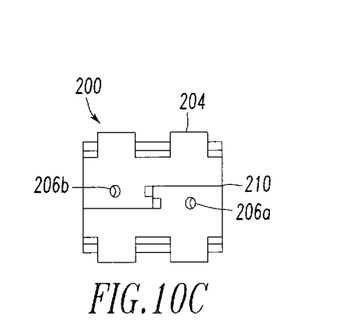

Referring now to FIG. 10C, shown is a side view of the pipe fitting 200 previously described in connection with FIG. 10A. For example, FIG. 10C may be a view of a sleeve 204 viewed from the side as shown by corresponding portions such as seam 210 of sleeve 204 previously described in connection with FIG. 10A. Shown are punched holes 206a and 206b.

Figure 10D:
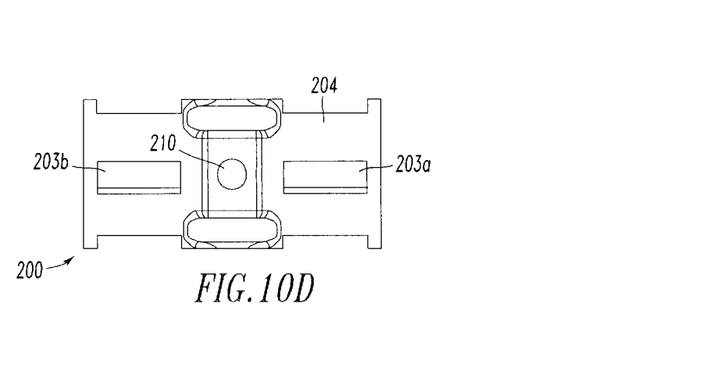

Referring now to FIG. 10D, shown is a top view looking downward at the pipe fitting previously described in connection with FIG. 10A.

Referring now to FIGS. 11A–11D, shown are views of an eleventh embodiment of a pipe fitting that may be used in connecting two pipes or tube-like structures. Shown in FIG. 11E is a bushing that may be used in connection with the pipe fitting 400 of FIGS. 11A–11D.

It should be noted that the pipe fitting 400 include similar structure and elements to that as described in connection with FIGS. 1A–1D. The pipe fitting 400 includes two sleeves 406 and 408. A pipe may be inserted into sleeve 408 at one opening and exit through an opening at the opposite side. A pipe may also be inserted into sleeve 406 in one opening 404 to a defined insertion point. The sleeves 406 and 408 and pipes inserted therein form a T-like structure or arrangement. Punched holes 410a and 410b that may be included are matched or mated punched holes that may be used for example, in visual observing how far a pipe is inserted into sleeve 406 as well as used together in connection with a screw inserted into and through holes 410a and 410b and corresponding holes in the inserted pipe to secure the pipe in the sleeve 406. Elements 412a and 412b are similar to those, respectively described in connection with elements 24 and 26. As may be seen by viewing the figures, other elements, although not specifically called out in FIGS. 11A–11D, are also similar to ones noted in FIGS. 1A–1D.

Figure 11A:
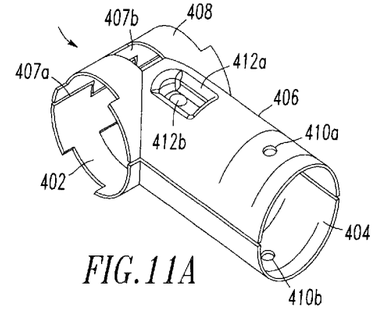
FIGS. 11A through 11D are different views of an example of an eleventh embodiment of a pipe fitting.
Figure 11B:
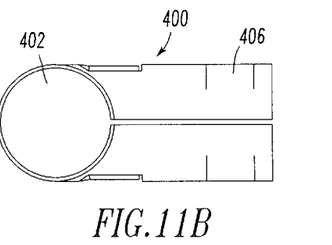

Referring now to FIG. 11B, shown is a view from a first side of the pipe fitting 400 of FIG. 11A. This view is shown looking into the sleeve opening 402.

Figure 11C:
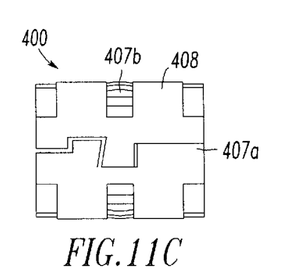

Referring now to FIG. 11C, shown is another side view facing a back face of sleeve 408 of pipe fitting 400. Opening 407*b* shows a portion of a bushing that may be inserted into the opening of sleeve 408. This bushing is described in more detail in connection with other Figures.

Figure 11D:
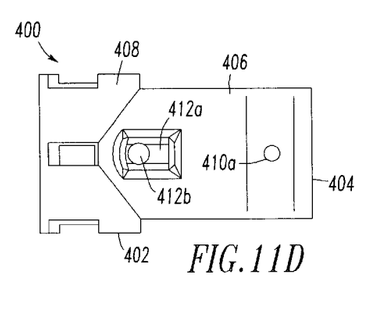
Figure 11E:
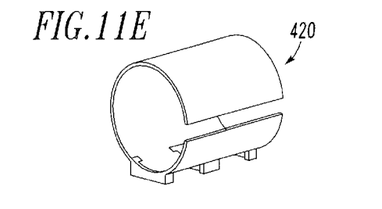
FIG. 11E is an example of an embodiment of a bushing which may be used in connection with the pipe fitting embodiments of FIGS. 10A–10D and FIGS. 11A–11D.

Referring to FIG. 11D, shown is a top view looking down at the pipe fitting 400 of FIG. 11A.

Referring now to FIG. 11E, shown is an example of an embodiment of a bushing 420 that may be used in connection with the pipefitting embodiments 200 and 400. The bushing 420 in the example may be made of nylon or other similar material. The bushing 420 may be inserted into the through hole opening of sleeve 408. This bushing may be used to allow the tube, for example, as may be inserted into sleeve 408, to rotate.

Referring now to FIGS. 12A–12D, shown is another embodiment of a pipe fitting that may be used in connecting two pipes or tube like structures. It should be noted that the pipe fitting 240 described in FIGS. 12A–12D is a variation of the previously described pipe fitting as shown in connection with FIGS. 10A–10D. The pipe fitting 240 includes two cylindrical sleeves 242 and 244 which are similar to those as described such as 204 and 202 in connection with FIG. 10A. The difference in the pipe fitting 240 in contrasting with the pipe fitting arrangement 200 of FIG. 10A is that in FIGS. 10A–10D, the nylon bushings may be included to allow an inserted tube to rotate therewithin. In FIGS. 12A–12D, the tubes may be rigidly clamped and held in a stationary position.

Figure 12A:
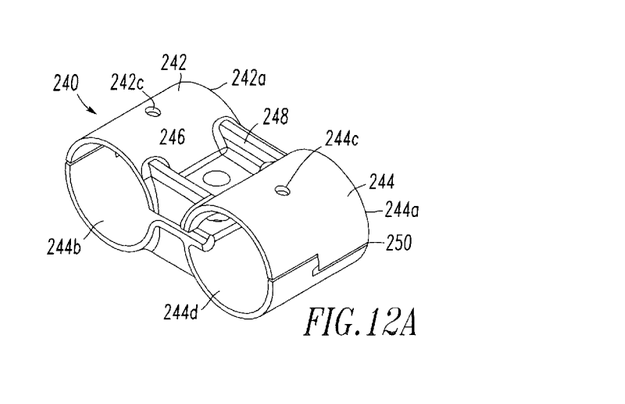
FIGS. 12A through 12D are different views of an example of a twelfth embodiment of a pipe fitting.
Figure 12B:
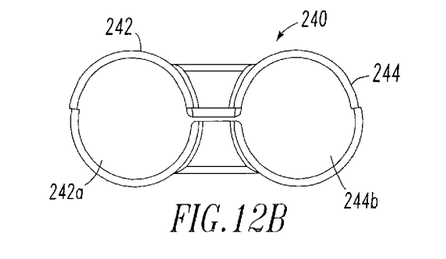

Referring now to FIG. 12B, shown is a front view of the pipe fitting 240 previously described in connection with FIG. 12A. The view shown in FIG. 12B is looking into the openings of each of the cylindrical sleeves 242 and 244, for example, through opening or holes 242*b* and 244*b*, respectively, each extending through the sleeves 242 and 244 which are open at opposite ends.

Figure 12C:
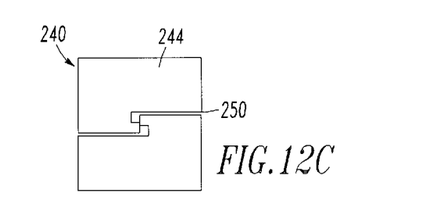

Referring now to FIG. 12C, shown is a side view of one of the sleeves, such as 244, as may be seen by the seam 250 of sleeve 244 previously described in connection with FIG. 12A.

Figure 12D:
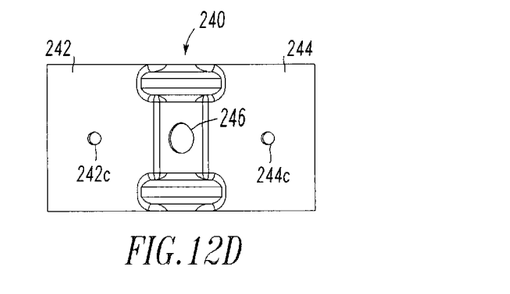

Referring now to FIG. 12D, shown is a top or downward view of the pipe fitting 240 previously described in connection with FIG. 12A. This may be seen, for example, by observing an opening such as 242*c* and 244*c* of each of the sleeves, respectively 242 and 244.

As described elsewhere herein, each of the punched holes such as 242*c* and 244*c* may be used as visual indicators of pipes inserted into each of the respective sleeves. It should also be noted that each of these punched holes, such as 242*c* and 244*c*, may have a corresponding or matching opening in the bottom portion of each of the sleeves as also described elsewhere herein and may be used, for example, as a means for securing a pipe in each of the corresponding sleeves, for example, by passing a fastener or other type of threaded screw through the top and bottom portions of the pipe as well as the top and bottom portions of the corresponding sleeve into which pipe is inserted.

Referring now to FIGS. 13A–13D, shown is another embodiment of a pipe fitting which may be used as a three way pipe fitting, for example, such as in connecting three pipes or tube-like structures. The pipe fitting 260 includes three members 262, 264 and 266. The first member 262 is a cylindrical sleeve open at both ends as indicated by openings 262*a* and 262*b*. A punched hole or holes may appear in opposite sides of the cylindrical sleeve as indicated, for example, by one of the punched holes 268*b* which may have a corresponding or matching punched hole (not shown) in the opposite side facing punched hole 268*b* through opposing side of the cylindrical sleeve 262. The cylindrical sleeve 262 is connected to two other members 264 and 266 which may be similar. Member 264 includes an outer portion into which a pipe may be inserted having an opening at one end. The opening 264*a* is shown within member 264.

Figures 13A, 13B, 13C, 13D, 14A, 14B:
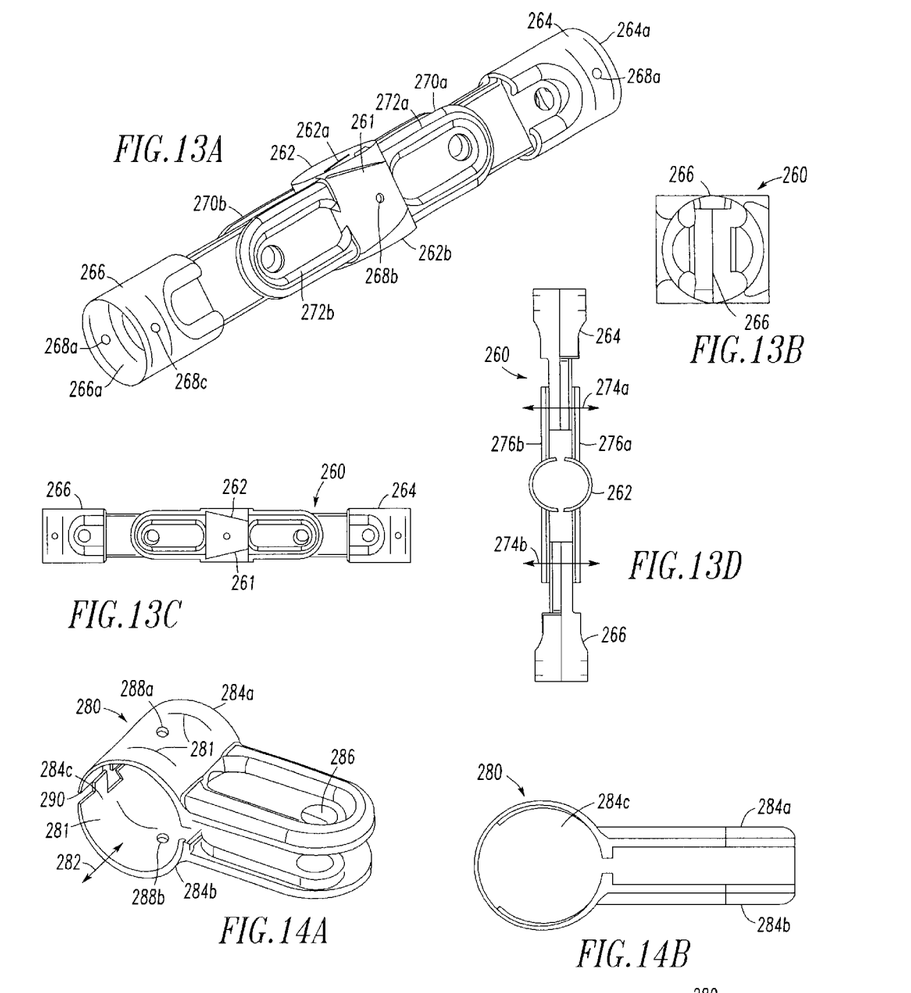
FIGS. 13A through 13D are different views of an example of a thirteenth embodiment of a pipe fitting.
FIGS. 14A through 14D are different views of an example of a fourteenth embodiment of a pipe fitting.

Member 264 may also include a punched hole 268*a* that may have a corresponding punched hole (not shown) on an opposite wall or side of member 264. It should be noted that member is 264 is cylindrical in shape having an opening at one end as indicated by opening 264*a*. Thus, as described elsewhere herein, punched holes, such as 268*a*, may be used as a visual indicator regarding the degree of insertion of a pipe into opening 264*a*. Additionally, as also described elsewhere herein, the punched hole 268*a* and a matching hole (not shown) in an opposite face of the sleeve 264 may be used as a matched pair, for example, in connection with a fastening or securing means for securing a pipe inserted into opening 264*a*. Member 264 is connected to cylindrical sleeve 262 by having a portion of the member 264 overlap an extension area 272*a* extending from the cylindrical sleeve 262. It should be noted that member 266 also is similar to that as described in connection with member 264. Member 266 is also similarly connected to member 262.

It should be noted that the three members 262, 264 and 266 may be connected together using techniques similar to those described in connection with pipe fitting 180 of FIG. 9A. In other words, the technique described in connection with pipe fitting 180 of FIG. 9A to attach members 188*a* and 188*b* to a connecting portion 190 of member 184 includes using a fastening means, such as by passing a bolt or screw through corresponding holes mated in each of the arms 188*a*, 188*b*, and holes or openings in the connecting portion 190. This exerts an inward type of pressure pulling the two arms 188*a* and 188*b* inwardly to securely and snugly fasten the arms 188*a* and 188*b* to the connecting portion 190 in a stationary position in accordance with the degree in which a fastener may be tightened. Similarly, each of the members 264 and 266 may be attached to member 262 using similar techniques.

It should be noted that each of the members 262, 264, and 266 may include punched holes. For example, member 266 may include matching punched holes 268*c* and 268*d*, member 264 may include punched hole 268*a* and a matching punched hole (not shown), and member 262 may also include punched hole 268*b* and a matching punched hole (also not shown) that may be used as visual indicators for pipes inserted, or in securing an inserted pipe as described elsewhere herein in connection with other embodiments.

It should also be noted that member 262 may include ribbings in the fitting to increase the fitting holding power of an inserted pipe, and the like, into member 262 through openings 262*a* and 262*b*.

Referring now to FIG. 13B, shown is a front view of the pipe fitting 260 looking into member 266 through opening 266*a*.

Referring now to FIG. 13C, shown is a side view of the pipe fitting 260 previously described in connection with FIG. 13A.

Referring now to FIG. 13D, shown is a top down view looking downward at the pipe fitting 260 previously described in connection with FIG. 13A. What will now be described in more detail are how the different members 262, 264 and 266 may fit together and how they may be attached. Member 264 may be attached to member 262 by securing a fastening means such as a bolt, threaded screw or other equivalent through holes in each of portions 264 and 262 as indicated along a direction indicated by arrow 274a. In other words, a fastening means such as a bolt or screw may be inserted through holes that are punched in corresponding portions of the components along line 274a. Similarly, component 266 may be attached to component 262 as indicated along line 274b.

It should be noted that in this embodiment, component 262 which includes a cylindrical sleeve 262a described elsewhere herein and extending portions such as 272a may be formed of two separate pieces 276a and 276b such that when the fastening means is inserted as indicated along lines 274a, the two components 276a and 276b are pulled towards each other inwardly by a force exerted as by tightening the fastener or the like. Similarly, the same type of force is exerted along the lines by inserting the fastener or fastening means such as a screw or bolt in the holes punched indicated along line 274b.

Referring now to FIGS. 14A–14D, shown is yet another embodiment of a pipe fitting. The pipe fitting 280 of FIG. 14A includes a top portion 284a and a bottom portion 284b which, when attached, such as by securing a bolt or screw through holes 286 in the top and bottom portions are pulled inward toward each other such that the top and bottom portions are brought together. Thus the top and bottom portions 284a and 284b form a cylindrical sleeve 284c into which a pipe, for example, may be inserted in a direction indicated by arrow 282. The cylindrical sleeve 284c is open at both ends. Also included in the top portion 284a is a punched hole 288a that may be used, for example, as a visual indicator as to how far a pipe is inserted into the sleeve 284c. Additionally, there may also be a corresponding or mated punched hole in the bottom portion such as indicated by 288b which "matches up" with the punched hole in the top portion 288a. As described elsewhere herein, in combination, the two punched holes 288a and 288b may be used in securing a pipe inserted into the sleeve 284, such as by having holes also punched in the inserted pipe at particular points and securing the pipe in the sleeve 284c. A fastener, threaded screw, and the like may pass through all of the corresponding openings in all of the parts all of the components such as 284a, 284b and the inserted pipe.

It should be noted that the embodiment of the pipe fitting 280 may also include ribbings 281 to increase the fitting's holding power with respect to a pipe, and the like, as may be inserted into sleeve 284c through openings at both ends in the direction indicated by arrow 282.

Referring now to FIG. 14B, shown is a view of the pipe fitting 280 from FIG. 14A looking into the sleeve through opening 284c.

Figure 14C:
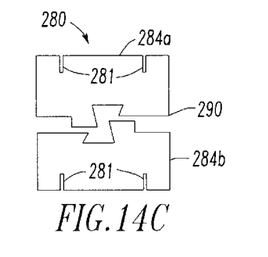

Referring now to FIG. 14C, shown is another view of the pipe fitting 280 with a perspective taken by looking along the side of the cylindrical sleeve facing seam 290.

Figure 14D:
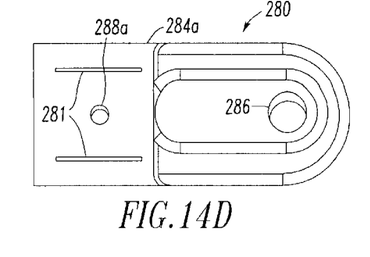

Referring now to FIG. 14D, shown is shown as top down view looking at pipe fitting 280.

In all of the foregoing embodiments, it should be noted that the punched hole, such as may be used as a visual indicator regarding the degree of insertion of a pipe into a component, or alternatively used as a fastening means with a matching punched hole as described elsewhere herein, may vary in size. For example, referring back to FIG. 3D, shown is an example of punched hole 58b included in pipe fitting 50 which is approximately 4.0 millimeters. It should be noted that other holes of varying degrees and sizes may be used in accordance with their intended function. For example, the size of a punched hole may vary in accordance with the size of a fastener or threaded screw, for example, inserted through punched hole in a top and bottom portion of a sleeve for securing a pipe. Additionally, it should also be noted that different materials may be used in accordance with each particular embodiment and function intended for the pipe fittings. For example, steel pipes and pipe fittings may be used as a alternative to other materials if a more sturdy structure is desired as well as if the environment in which a resulting shelving unit being formed using the pipes and pipe fittings calls for using steel over another type of material. It should also be noted that any one of a variety of different types of fastener, threaded screw and the like may be used in securing an inserted pipe into a pipe fitting. Additionally, any one of a variety of securing means may also be used in holding or securing various components of a pipe fitting together for example such as the top portion 284a being secured to the bottom portion 284b using a screw or bolt that may be inserted for example through openings at point 286 in connection with the pipe fitting embodiment 280 of FIG. 14A. The pipes in the foregoing embodiments are shown to be tubular and may be inserted into pipe connectors capable of receiving such pipes. It should be noted that the techniques described herein are not limited to use with tubular shaped pipes inserted into cylindrical sleeves, members and the like. The foregoing techniques also apply to embodiments in which the pipes and the openings for receiving the pipes in the pipe fitting may be any one of a variety of geometric shapes. Additionally, the pipes and pipe connectors described herein may be used in constructing any one of a variety of arrangements including shelving arrangements.

It should be noted that there the punched holes or mated pairs may have other uses. The insertion of a screw or rivet through one or more punched holes may prevent an inserted tube from rotating in a fitting under a torqueing type force or load. Additionally, insertion of a screw or rivet through one or more holes and through the wall of the inserted tube may also prevent separation of the tube from the fitting in a pulling application, and be used to provide structural and dimensional integrity. The setting of a rivet through the hole and wall of the tube may provide a tamper proof installation as the fitting may not be readily disassembled. The insertion of a fastener or rivet through the hole in the fitting and the wall of the tube may provide vibration resistance in installation with high vibration or active loading.

It should also be noted that the foregoing arrangement may be used in constructing workbenches, carts, racks, and other structures in addition to forming shelving arrangements.

Additionally, one or more of the punched holes through the body of the fitting provides and easy and dimensionally accurate hole for drilling through the concave surface of the tube. As described elsewhere, a punched hole may be used as a safety check to verify whether an inserted tube or pipe is properly inserted and seated. The pipe fitting arrangement may be sold in a variety of different forms including bulk form.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for connecting at least one pipe to a fitting which includes at least two sleeves joined at a connection wherein at least one sleeve is formed of a first upper portion and a separate second lower portion such that each longitudinal edge of the first portion is positioned in a spaced-apart, adjacent relationship with each longitudinal edge of the second portion to form a member having an opening for receiving a pipe and the at least one sleeve further includes at least one alignment hole positioned remotely from the connection of the at least two sleeves and a pocket opening in both the upper and lower portion positioned between the alignment hole and the connection of the at least two sleeves comprising:

inserting said pipe into the opening in said member to a first point of insertion;

determining, using the at least one alignment hole in said member, whether said pipe is inserted to a predetermined desired point; and securing the pipe to the first and second portions of the at least one sleeve forming the member by inserting a fastener through each pocket opening and securing a fastening element to the fastener.

2. The method of claim 1, wherein said member includes at least one ribbing.

3. The method of claim 1, wherein said member includes at least two matching alignment holes with each hole being in opposite sides of said member, and said pipe includes punched holes corresponding to said alignment holes in said member, and the method further includes:

securing said pipe in said member by passing another fastener through said alignment holes in said pipe and said member.

4. The method of claim 3, wherein said another fastener is one of a screw and a bolt.

5. The method of claim 1 further comprising:

drilling a hole in said pipe using said at least one alignment hole as a drilling guide indicating a drilling position in said pipe.

6. The method of claim 1, wherein the step of inserting comprises:

inserting said pipe into a bushing;

inserting said bushing into said member and rotating said pipe.

7. The method of claim 6, wherein said fitting includes two members forming a T-like structure and said bushing is inserted into one of said two members.

8. The method of claim 7, wherein said bushing and said pipe pass through said member.

9. The method of claim 1, wherein said fitting includes two members.

10. The method of claim 9, wherein said two members form a t-like structure.

11. The method of claim 10, wherein at least one member forms a cylindrical sleeve into which a first of said at least one pipe is inserted.

12. The method of claim 11, wherein said cylindrical sleeve is open at both ends and the step of inserting comprises:

inserting said first pipe through said cylindrical sleeve.

13. The method of claim 12, further comprising, prior to inserting said first pipe:

inserting a bushing into said cylindrical sleeve allowing a pipe inserted therein to rotate.

14. The method of claim 12, wherein the other of said members is open at only one end for receiving another pipe.

15. The method of claim 10, wherein the other of said members includes a curved arc for receiving another of said pipes, said curved arc having a minimum arc length slightly greater than half the circumference of the another of said pipes such that curved arc incompletely surrounds the another of said pipes.

16. The method of claim 15, wherein said curved arc is open at both ends.

* * * * *